(12) United States Patent
Baum et al.

(10) Patent No.: US 8,321,637 B2
(45) Date of Patent: *Nov. 27, 2012

(54) COMPUTING SYSTEM WITH OPTIMIZED SUPPORT FOR TRANSACTIONAL MEMORY

(75) Inventors: Richard I. Baum, Austin, TX (US); Thomas J. Heller, Jr., Rhinebeck, NY (US)

(73) Assignee: International Business Machines Corporation, Armonk, NY (US)

( * ) Notice: Subject to any disclaimer, the term of this patent is extended or adjusted under 35 U.S.C. 154(b) by 522 days.

This patent is subject to a terminal disclaimer.

(21) Appl. No.: 11/748,044

(22) Filed: May 14, 2007

(65) Prior Publication Data

US 2008/0288727 A1 Nov. 20, 2008

(51) Int. Cl.
*G06F 12/00* (2006.01)
(52) U.S. Cl. .......... 711/150; 707/703
(58) Field of Classification Search .......... 711/149, 711/152
See application file for complete search history.

(56) References Cited

U.S. PATENT DOCUMENTS

| | | | |
|---|---|---|---|
| 3,686,641 A | | 8/1972 | Logan et al. |
| 5,428,761 A | * | 6/1995 | Herlihy et al. .......... 711/130 |
| 5,701,432 A | | 12/1997 | Wong et al. |
| 5,742,785 A | | 4/1998 | Stone et al. |
| 5,946,711 A | * | 8/1999 | Donnelly .......... 711/152 |
| 5,963,922 A | | 10/1999 | Helmering |
| 5,974,438 A | | 10/1999 | Neufeld |
| 6,035,379 A | * | 3/2000 | Raju et al. .......... 711/162 |
| 6,078,999 A | * | 6/2000 | Raju et al. .......... 711/161 |
| 6,360,220 B1 | | 3/2002 | Forin |
| 6,360,231 B1 | | 3/2002 | Pong et al. |
| 6,381,676 B2 | | 4/2002 | Aglietti et al. |
| 6,510,498 B1 | | 1/2003 | Holzle et al. |
| 6,611,906 B1 | | 8/2003 | McAllister et al. |
| 6,651,146 B1 | | 11/2003 | Srinivas et al. |
| 6,738,837 B1 | | 5/2004 | Wyland |
| 6,826,757 B2 | | 11/2004 | Steele, Jr. et al. |
| 6,862,664 B2 | | 3/2005 | Tremblay et al. |
| 6,874,065 B1 | | 3/2005 | Pong et al. |
| 6,880,045 B2 | | 4/2005 | Pong et al. |
| 6,880,071 B2 | | 4/2005 | Steele, Jr. et al. |
| 6,938,130 B2 | | 8/2005 | Jacobson et al. |

(Continued)

OTHER PUBLICATIONS

Moore, Kevin et al., LogTM: Log-Based Transactional Memory, Feb. 15, 2006, 12$^{th}$ Annual International Symposium on High Performance Computer Architecture (HPCA-12).*

(Continued)

*Primary Examiner* — Brian Peugh
*Assistant Examiner* — Nicholas Simonetti
(74) *Attorney, Agent, or Firm* — Cantor Colburn LLP; John Campbell

(57) ABSTRACT

A computing system processes memory transactions for parallel processing of multiple threads of execution by support of which an application need not be aware. The computing system transactional memory support provides a Transaction Table in memory and a method of fast detection, of potential conflicts between multiple transactions. Special instructions may mark the boundaries of a transaction and identify memory locations applicable to a transaction. A 'private to transaction' (PTRAN) tag, directly addressable as part of the main data storage memory location, enables a quick detection of potential conflicts with other transactions that are concurrently executing on another thread of said computing system. The tag indicates whether (or not) a data entry in memory is part of a speculative memory state of an uncommitted transaction that is currently active in the system.

25 Claims, 7 Drawing Sheets

U.S. PATENT DOCUMENTS

| | | | |
|---|---|---|---|
| 6,981,110 | B1 | 12/2005 | Melvin |
| 7,000,234 | B1 | 2/2006 | Shavit et al. |
| 7,017,160 | B2 | 3/2006 | Martin et al. |
| 7,039,794 | B2 | 5/2006 | Rodgers et al. |
| 7,089,374 | B2 | 8/2006 | Tremblay et al. |
| 7,107,402 | B1 | 9/2006 | Melvin |
| 7,117,502 | B1 | 10/2006 | Harris |
| 7,178,062 | B1 | 2/2007 | Dice |
| 7,865,701 | B1 | 1/2011 | Tene et al. |
| 2002/0073071 | A1 | 6/2002 | Pong et al. |
| 2002/0078308 | A1* | 6/2002 | Altman et al. ............... 711/147 |
| 2002/0103804 | A1* | 8/2002 | Rothschild et al. ............ 707/10 |
| 2002/0199069 | A1* | 12/2002 | Joseph ......................... 711/147 |
| 2003/0066056 | A1 | 4/2003 | Petersen et al. |
| 2003/0079094 | A1 | 4/2003 | Rajwar et al. |
| 2003/0084038 | A1 | 5/2003 | Balogh et al. |
| 2003/0204682 | A1 | 10/2003 | Ueno |
| 2004/0034673 | A1 | 2/2004 | Moir et al. |
| 2004/0162948 | A1 | 8/2004 | Tremblay et al. |
| 2004/0187127 | A1 | 9/2004 | Gondi |
| 2004/0267828 | A1* | 12/2004 | Zwilling et al. ............. 707/200 |
| 2005/0060559 | A1 | 3/2005 | McKenney |
| 2005/0086446 | A1 | 4/2005 | McKenney et al. |
| 2006/0173885 | A1 | 8/2006 | Moir et al. |
| 2006/0206692 | A1 | 9/2006 | Jensen |
| 2006/0212456 | A1 | 9/2006 | Earhart |
| 2006/0288173 | A1 | 12/2006 | Shen |
| 2007/0028056 | A1 | 2/2007 | Harris |
| 2007/0186056 | A1 | 8/2007 | Saha et al. |
| 2007/0282838 | A1 | 12/2007 | Shavit et al. |
| 2008/0288727 | A1 | 11/2008 | Baum et al. |

OTHER PUBLICATIONS

Yen et al., LogTM-SE Decoupling Hardware Transactional Memory from Caches, Feb. 14, 2007, 13th Annual International Symposium on High Performance Computer Architecture.*

Ananian et al., Unbounded Transactional Memory, 2005, IEEE Computer Society Washington DC, HPCA '05 Proceedings of the 11th International Symposium on High-Performance Computer Architecture, pp. 316-327.*

Grinberg et al: "Investigation of Transactional Memory Using FPGAs", School of Electrical Engineering, Tel Aviv University, Tel Aviv Israel, pp. 1-4.

Harris et al. "Transaclional Memory with Data Invariants", pp. 1-12.

Shriraman et al. "Hawrdware Acceleration of Software Transactional Memory", May 18, 2006, pp, 1-10.

Chung et al. "Tradeoffs in Transactonal Memory Virtualization", ASPLOS '06 Oct. 21-25, 2006, pp. 1-12.

"Thread: (Computer Science)" Wikipedia, http://en.wikipedia.org/wiki/Thread_(computer_science), pp. 1-7.

Wood, "Transactional Memory—An Overview of Hardware Alternatives", Transactional Memory Workshop, Apr. 8, 2005, pp. 1-22.

Soltis, "Inside the AS/400", 2nd Edition, Duke Press, pp. 1-6.

Katz, et al. Implementing a Cache Consistency Protocol, Research Paper, Electrical Engineering and Computer Science Department, University of California Berkely, pp. 1-31.

Banatre et al. "Cache Management in a Tightly Coupled Fault Tolerant Multiprocessor", 1990 IEEE, pp. 1-8.

"Securing Your Future with HP: A Transition Guide for Tru64 UNIX Customers", http://whitepapers.techrepublic.com.com/whitepaper.aspx?docid=275665&promo=100510, pp. 1-3.

"Native POSIX Thread Library", http://en.wikipedia.org/wiki/Native_POSIX_Thread_Library, pp. 1-3.

"Software Transactional Memory", Wikipedia, http://wikipedia.org/wiki/Software_transactional_memory, pp. 1-6.

Dice et al. "Transactional Locking II", pp. 1-15.

"Programming in the Age of Concurrency: Software Transactional Memory", http://channel9.msdn.com/Showpost.aspx?postid=231495, pp. 1-17.

Herlihy et al. "Transactional Memory: Architectural Support for Lock-Fred Data Structures", 1993 IEEE, pp. 289-300.

Herlihy "What Can We Prove About Transactional Memory?", Brown University, pp. 1-67.

Rajwar et al. "Speculative Lock Elision: Enabling Highly Concurrent Multithreaded Execution", 2001 IEEE, pp. 294-305.

Mohamed "The Posix Interface for the Unicon Programming Language", http://www.drones.com/unicon/, pp. 1-21.

Wheeler "Secure Programmer: Prevent Race Conditions", http://www.128.ibm.com/developerworks.linux/library/1-sprace.html, pp. 1-10.

"Multithreaded Programming Guide Products and Services", http://docsun.cities.uiuc.edu/sun_docs/C/solaris_9/SUNWdev/MTP/p56.html, pp. 1-4.

"Multithreaded Programming Guide" http://docs.sun.com/app.docs/doc/806-6867/6jfpgdcop?1=sv&a=view, pp. 1-13.

"Writing Multithreaded Java Applications", http://www-128.ibm.com/developerworks/java/library/j-thread.html, pp. 1-7.

Lee "The Problem with Threads", Innovative Technology for Computing Professionals, May 2006, pp. 1-19.

Kongetira et al. "Niagara: A 32-Way Multithreaded Sparc Processor", 2005 IEEE, pp. 21-29.

Rajwar et al. "Virtualizing Transactional Memory", pp. 1-12.

Ananian et al. "Unbounded Transactional Memory". Research Abstracts 2006, CSAIL Publications end Digital Archive, pp. 1-4.

Hammond et al. "Transactional Memory Coherence and Consistency", Stanford University, pp. 1-12.

"Tuple Space", http://c2.com/cgi/wiki?TupleSpace, pp. 1-5.

McDonald et al. "Architectural Semantics for Practical Transactional Memory", Computer Systems Laboratory Stanford University, pp. 1-12.

Kuszmaul et al. "Transactions Everywhere", http://www.cs.wisc.edu/-rajwar/tm-workshop/position_statements.htm. pp. 1-19.

L.C. Heller et al. "Millicode in an IBM zSeries Processor"; IBM Journal of Research & Development, vol. 48, No. 3/4, May/Jul. 2004, pp. 425-434.

U.S.P.T.O Communication, Final Rejection for U.S. Appl. No. 11/928,533 dated Apr. 8, 2011.

U.S.P.T.O Communication, Final Rjection for U.S. Appl. No. 11/928,594 dated Jul. 9, 2010.

U.S.P.T.O Communication, Final Rejection for U.S. Appl. No. 11/928,661 dated Aug. 27, 2010.

U.S.P.T.O Communication, Final Rejection for U.S. Appl. No. 11/928,758 dated Jul. 9, 2010.

U.S.P.T.O Communication, Final Rejection for U.S. Appl. No. 11/928,857 dated Jun. 8, 2011.

U.S.P.T.O Communication, Non-Final Rejection for U.S. Appl. No. 11/928,661 dated Apr. 2, 2010.

U.S.P.T.O Communication, Non-Final Rejection for U.S. Appl. No. 11/928,758 dated Apr. 16, 2010.

U.S.P.T.O Communication, Non-Final Rejection for U.S. Appl. No. 11/928,857 dated Nov. 26, 2010.

U.S.P.T.O Communication, Non-Final Rejection for U.S. Appl. No. 11/928,533 dated Oct. 29, 2010.

U.S.P.T.O Communication, Non-Final Rejection for U.S. Appl. No. 11/928,594 dated Mar. 8, 2010.

U.S.P.T.O Communication, Notice of Allowance for U.S. Appl. No. 11/928,594 mailed May 25, 2011.

U.S.P.T.O Communication, Notice of Allowance for U.S. Appl. No. 11/928,661 mailed May 18, 2011.

U.S.P.T.O Communication, Notice of Allowance for U.S. Appl. No. 11/928,758 mailed Jun. 30, 2011.

U.S.P.T.O Communication, Requirement for Restriction/Election for U.S. Appl. No. 11/928,533 dated Jun. 28, 2010.

Moore, Kevin et al., LogTM: Log Based Transactional Memory, Feb. 15, 2006, 12th Annual International Symposium on High Performance Computer Architecture (HPCA-12) Cited in U.S. Appl. No. 11/748,044;11/928,533; 11/928,594; 11/928,661; 11/928,758.

Rajwar et al; Virtualizing Transactional Memory; Proceedings of 32nd International Symposium on Computer Arcvhtecture; IEE Jun. 4, 2005-Jun. 8, 2005 Cited in U.S. Appl. No. 11/928,594.

Ananian et al; Unbounded Transactional Memory; 11th International Symposium on High-Performance Computer Architecture; IEEE; Mar. 7, 2005; Cited in U.S. Appl. No. 11/928,661.

Saha et al; Architectural Support for Software Transactional Memory; 39th Annual IEEE?ACM International Symposium on Microarchitecture; Dec. 9, 2006 Dec. 13, 2006 Cited in U.S. Appl. No. 11/928,758.

McDonald et al; Architectural Sematics for Practical Transactional Memory; Proceedings of the 33rd International Symposium on Computer Architecture; IEEE; Jun. 17, 2006-Jun. 21, 2006 Cited in U.S. Appl. No. 11/928,758.

Saha et al; McRT-STM; A High Performance Software Transactional Memory System for a Multi-Core RUntime; PPoPP '06; ACM Mar. 29, 2006-Mar. 31, 2006 Cited in U.S. Appl. No. 11/928,758.

MATE: Micro Assist Thread Engine; IP)C)M00027405D; IBM; Apr. 7, 2004 Cited in U.S. Appl. No. 11/928,758.

Yen et al, LogTM-SE Decoupling Hardware Transactional Memory from Caches, Feb. 14, 2007, 13th Annual International Symposium on High Performance Computer Architecture, cited in U.S. Appl. No. 11/748,044.

PCT/EP2010/062302—International Search Report dated Nov. 22, 2010.

PCT/EP2010/062302—Written Opinion dated Nov. 22, 2010.

\* cited by examiner

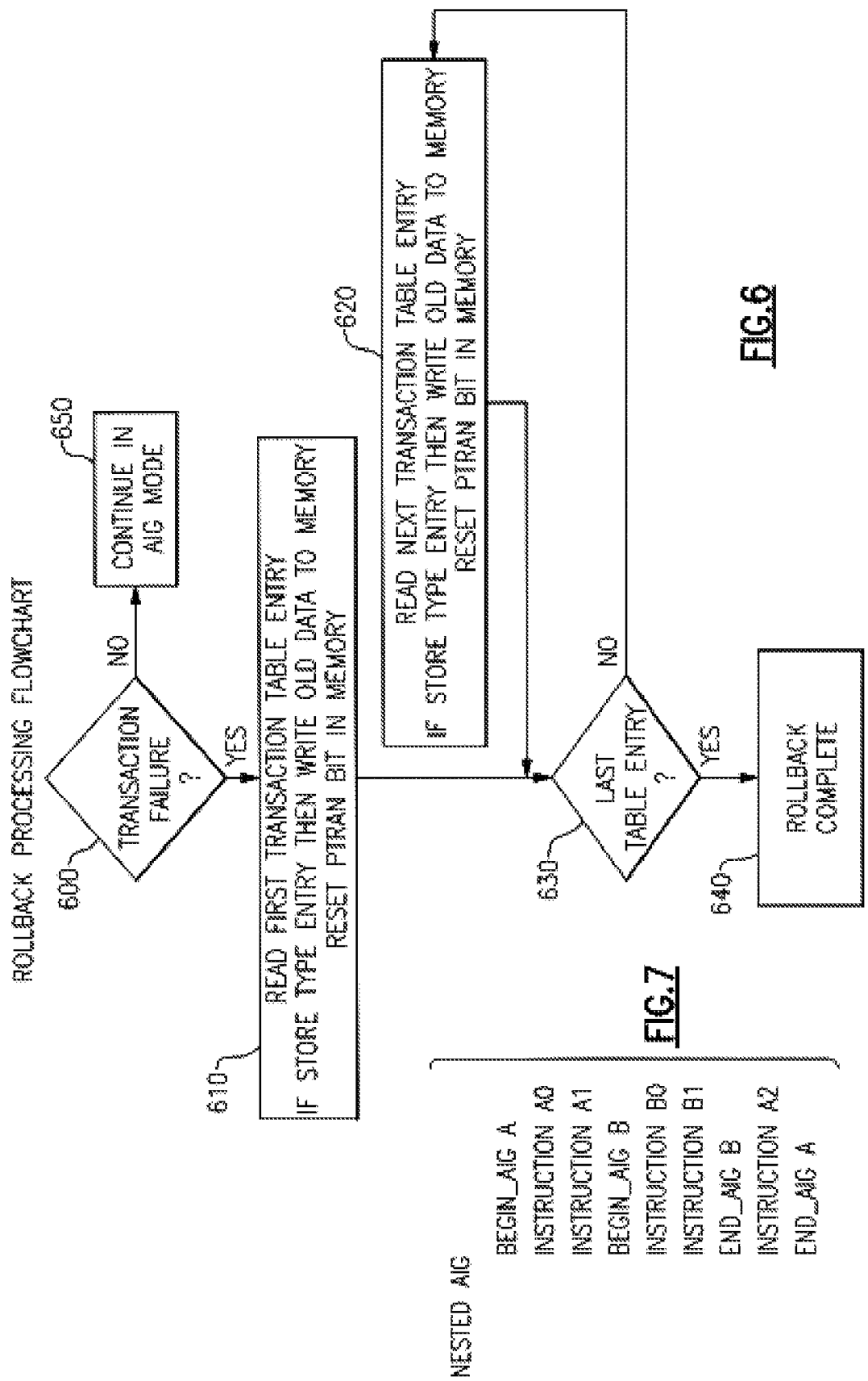

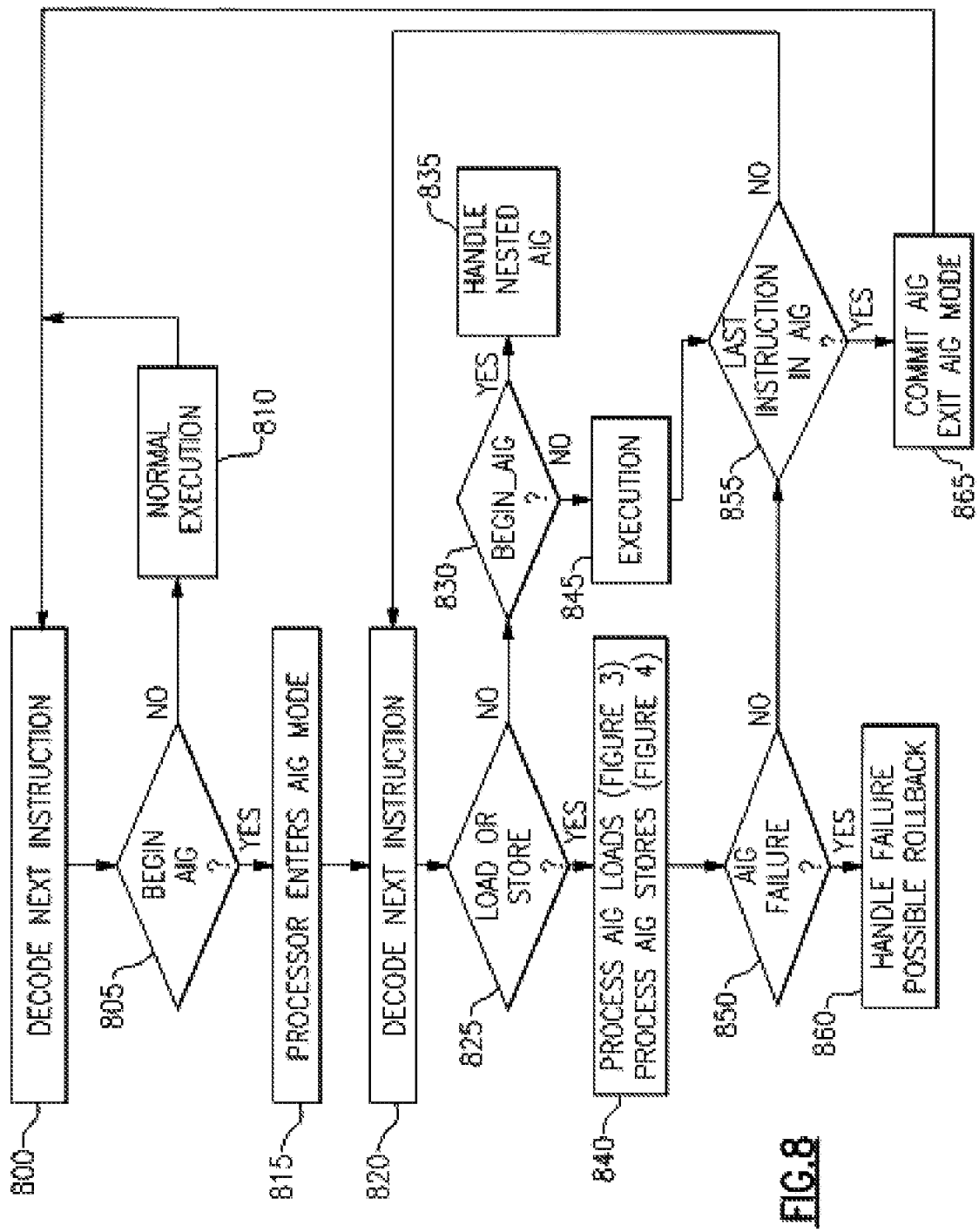

COMPUTING SYSTEM WITH OPTIMIZED SUPPORT FOR TRANSACTIONAL MEMORY

IBM® is a registered trademark of International Business Machines Corporation, Armonk, N.Y., U.S.A. Other names used herein may be registered trademarks, trademarks or product names of International Business Machines Corporation or other companies.

BACKGROUND OF THE INVENTION

1. Field of the Invention

This invention relates to computer systems, and particularly to a computing system with optimised support for transactional memory.

2. Description of Background

Current multiprocessor and multithreaded computing systems allow the performance of a single software application to be scaled to many times the possible performance of a single threaded application. Current software and hardware systems provide for the parallel processing of multiple threads of execution. Software applications can use existing thread libraries, such as the POSIX pthread library, to control the creation of multiple threads of parallel execution. The use of multiple threads works well for applications that operate on easily partitioned tasks and data. Course grain locks can be used to control access to the few shared data structures to prevent rare conflicts between the data updates of multiple threads.

Many software applications contain data structures that must be shared among multiple threads and have frequent concurrent inspections and updates of the shared data structures. These applications require additional modifications in order to obtain good sealing when using large numbers of threads. Applications which use multiple threads of execution that access shared data structures currently require the use of specialised data locking routines in order to produce a reliable outcome that Is free from deadlocks and corrupted data. The majority of existing multithreaded applications in this category use fine grained software locks to achieve good performance and correct operation. Writing high performance multithreaded programs which use fine grained software locks is extremely difficult and requires expert programming skills. The lack of these skills in the software industry severely limits the production of multithreaded applications which require the use of shared data structures and therefore the usefulness of multithreaded and multiprocessor computing systems for certain, application classes, including many forms of transaction pressing.

Various "Transactional Memory" systems have been proposed and built to provide a simpler programming model for constructing multithreaded applications that need to control access to shared data structures. These systems allow software running on one thread of execration to optimistically assume that shared data structures can be updated without conflict with the accesses and updates of other threads of execution. The speculative updates to memory are kept "pending" until the transactional memory system confirms that no conflicts with storage accesses of other threads have occurred. The transactional memory system must be able to discard the pending speculative updates when conflicts between the storage accesses of multiple threads are detected. The existing transactional memory systems range from those that rely completely on new software constructs to those that rely on a mixture of hardware and software to obtain reasonable performance. Some existing systems have very high overhead in terms of the number of instructions executed in support of the required transactional memory behavior. Other existing systems have limitations associated with complex data cache structures that hold the "pending" updates to memory in caches. The cache based systems use many additional cache coherency states which causes a large Increase in the design and simulation efforts for those systems.

Recently transactional memory systems have been proposed as illustrated by Microsoft's United States Patent Application Publication No. US2007/0023056 which use software "enlistment records" associated with memory locations that have been accessed by transactions. The Microsoft system also uses a "version value" in the "enlistment record". FIG. 3 of Pub. No. 2007/0029056 includes an operation "Locate enlistment record of memory location". The text describing FIG. 3 gives the example of the enlistment record being part of a software object at the referenced memory address. From Pub. No. 2007/0028056 in paragraph 24, it will be seen that Timothy L. Harris, the Microsoft Inventor, indicates that an enlistment record is created with the use of a "software transactional memory interface". The Microsoft Pub. No. 3007/0023036 uses version numbers associated with each enlistment record and needs to deal with cases where the version number exceeds the maximum number supported by the enlistment record. In hindsight, after learning of the details of our invention, it will be recognized that these features of the recent developments in transaction memory systems are not needed and cad be improved upon.

Earlier, and now long ago, as pointed out In the development of fast paced computing systems developments summarized by David A. Wood, University of Wisconsin, Transactional Memory Workshop, Apr. 8, 2005, it was Chang and Mergen of IBM (described in 801 Storage: Architecture and Programming) who proposed using a lock bit associated with each segment of virtual memory. Their system provided an ability to detect concurrent accesses of storage locations by multiple threads but restricted the total number of concurrent threads that could operate on any single virtual memory segment when the transaction locking mechanism becomes active. Large virtual memory page tables which are required by Chang and Mergen to execute concurrent threads imposes a performance penalty on all threads of execution that use virtual memory, not just those that execute "transactions, so the Chang and Mergen suggestions became an anecdote in the prior art, as Woods said "No one seems to be looking at what they learned". The current invention uses a "Transaction Table" that is distinct from the virtual memory page tables of the system.

Unknown to Woods, in the Chang and Merges IBM Yorktown facility there have been ongoing laboratory developments relating to transactional memory systems, culminating with the most recent transactional memory system described by Xiaowel Shen U.S. patent application Ser. No. 11/156913, filed Jun. 20, 2005, and entitled "Architecture Support of Best-Effort Atomic Transactions for Multiprocessor Systems".

Shen describes a transactional memory system which focuses on using "caches as buffers for data accessed by atomic transactions". Xiaowel Shen forces the failure of a transaction when the system detects a "buffer overflow" and does not propose dealing with the case of speculative data being evicted from the cache. A buffer overflow will result if too many transactional loads or stores target the same cache congruence class. The percentage of transactions which overflow the cache and fail will be proportional to the number of loads and stores contained in a transaction. Long transactions will fail more often.

Other systems have been proposed which use a cache to implement a conflict detection scheme, and to capture speculative data which overflows the cache. We have found it desirable not to rely primarily on data cache states for conflict detection. The required specialised cache states cause an undesired increase in complexity and also makes it difficult to add the required detection and isolation mechanisms to existing multiprocessor cache coherency designs. Nevertheless there are numerous attempts to exploit the cache which have been tried, besides the Xaiowei Shen development, including, Moore et al who describe the use of a "before-image log" in their paper "Log™: Log-based Transactional Memory". Moore uses cache coherency states to implement a conflict detection scheme. Another such system, Ananias et al describe a transactional memory system which uses a single "unsorted linear array data structure" to capture speculative data which overflows data caches. They use an extra bit per cache set, the "O" bit to indicate if that set has "overflowed", and another bit per cache entry, the "T" bit to indicate that the entry holds speculative data. The linear array data structure does provide the ability to support longer transactions but it does not provide the fast detection capability of the current invention. The linear array in Ananian needs to be searched for any cache access that targets the set that "overflowed". This can be a long process for transactions which cause many overflows. Rajwar, Herlihy and Lai take a similar approach as Ananian in their paper "Virtualizing Transactional Memory". Rajwar also uses a data cache as the primary mechanism to track the speculative state associated with transactions. Speculative data which is forced out of the caches is moved to the XADT overflow area in virtual memory. The detection of a possible conflict with an address that is part of the XADT requires a slow linear search of the XABT. Rajwar describes the use of filters to eliminate some of these searches but there are many cases where the searches will still need to be done.

In addition to the above summarised developments in the field, many software interfaces and instruction set modifications have been proposed for the support of transactional memory. The paper "Architectural Semantics for Practical Transactional Memory" (McDonald et al, Computer Systems Laboratory, Stanford University, 2006—this paper listed in our IDS is submitted herewith and is incorporated herein by reference) compares some of the proposals and provides references for many others and is incorporated herein by reference.

SUMMARY OF THE INVENTION

The shortcomings of the prior art are overcome and additional advantages are provided through the provision of a computing system which uses a combination of a "private to transaction" (PTRAN) tag, attached to each increment of real system memory, and a log of speculative loads and stores to provide an improved implementation of a transactional memory system. The current invention uses a log with the added mark bit employed as a "private to transaction" (PT-RAN) tag and associated with every increment of real system memory. Hardware is provided to quickly detect conflicts between the storage accesses of transactions running on multiple threads of execution. The use of the tag in memory and associated conflict detection hardware included in this invention provides a much faster transactional memory system with much less overhead when compared to existing systems. The complexity of the current invention is lower than prior attempts at using additional cache coherency states for conflict detection, especially for systems with large numbers of processors and associated inter connections.

The current invention uses the main memory array of the computing system to hold the speculative data and can support very long transactions. The current invention can benefit from the use of data caches but it does not require their use. The current invention provides the ability to check the address of a new memory access without a long search process for common cases. Likewise, it is an improvement over software only transactional memory systems since the conflict detection and use of the tag in memory eliminates some of the software overhead associated with tracking the speculative state of transactions. It also provides the ability to detect storage conflicts at a very fine level (down to a single byte) as opposed to prior art software systems that track updates to entire software objects which may be hundreds or thousands of bytes. Existing software systems will either give frequent over-indication of potential data conflicts or incur very large software path length penalties when attempting to track the updates to individual components of software objects.

Many software interfaces and instruction set modifications have been proposed for the support of transactional memory. The current invention can be used in combination with any of them in order to provide high performance transactional memory operations without incurring a large increase in hardware or software complexity. The preferred embodiment is described for the PowerPC architecture but anyone skilled in the art could apply the same approach to any other architecture such as IBM's zSeries* IBM's pSeries with the P3, P4, P5 processors, and even IBM's System 38 and its AS/400 which have a memory work of 65 bits could utilize the support of this invention, as well as other computer systems, such as Sun Microsystems' SPARC, Intel's IA32 etc. Anyone skilled in the art could extend the current invention for use with other Application Programming Interfaces (APIs) that may be created for other specialized versions of transactional memory implementations.

The current invention uses a hardware bit or bits associated with all memory locations, not just those that are currently part of an active transaction. The current invention uses the added hardware bit or bits to provide much faster execution of transactions than that which can be obtained using Microsoft's Pub. No. 2007/0028056. The current invention uses an improved transaction table as a log to optimise the memory usage and provides a system which uses less memory than would be used by other systems like the Microsoft proposal, yet the invention can execute applications developed for the Microsoft proposal. The current invention provides one or more PTRAN bits for every storage increment. There is no need in the current invention for an indirect method of "locating" the PTRAN bit. The current invention will provide a much faster indication of potential conflict since the PTRAN bit is a directly addressable part of the memory location to be marked. The current invention does not need a Microsoft style interface, and achieves its benefit using hardware and firmware to update and reset the PTRAN bit. The current invention does not require application software to be aware of the state of the PTRAN bit or bits although one may provide a direct interface if desired. The current invention is also optimised for a short commit processing time. The current invention does not require the use of a version number for each storage location.

We noted above the Chang and Mergen suggestions which became an anecdote in the prior art, as Woods said "No one seems to be looking at what they learned". An advantage of the current invention is that it uses a "Transaction Table" that is distinct from the virtual memory page tables of the system. This enables the current invention to process very large transactions and to provide conflict detection down to a single byte. The current invention has no limit on the number of concurrent threads that can simultaneously access memory locations in the same virtual memory segment. The current invention performs conflict detection on physical memory addresses (or real addresses) and only restricts simultaneous access at the granularity of this conflict detection. This granularity can differ for various implementations of the current invention but will usually be on the order of bytes. If the Chang and Mergen system tries to use large numbers of concurrent threads, that system could not provide similar benefits without using extremely large virtual page table formats and consequently incurring a performance penalty. The current invention does not impose this performance penalty.

System and computer program products for implementing transactions using the above-summarized methods are also described and claimed herein. Generally computer program products are delivered as computer program media which are tangible embodiments of the program delivering the instructions via a CD Rom, a computer disc drive, a connection to another system or other tangible embodiment of a signal for delivering a program signal to the computing system which supplies the support of this system, all collectively known as computer program media. The computer program media may be provided as an independent software medium installed in the computing system memory or installed as firmware embodied in the computing system memory itself during operation.

Additional features and advantages are realized through the techniques of the present invention. Other embodiments and aspects of the invention are described in detail herein and are considered a part of the claimed invention. For a better understanding of the invention with advantages and features, refer to the description and to the drawings.

TECHNICAL EFFECTS

As a result of the summarised invention, technically we have achieved a solution which provides a much faster transactional memory system with much less overhead when compared to existing systems. The current invention is also an improvement over existing hardware based transactional memory systems that rely on changes to cache coherence protocols. It allows the hardware system to deal with transactions which are long enough to overflow average size caches and doesn't involve the virtual memory management overhead of prior art schemes. The current invention has a much lower level of hardware complexity and is easier to implement and verify via simulation. It also allows for the ability to detect conflicts at a finer granularity than the cache line granularity of prior art systems that are tightly coupled with data caches. The current invention also allows for the fast execution of nested transactions.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

FIG. 6 shows our rollback processing flowchart.

FIG. 7 illustrates new special instructions and Atomic Instruction Group (AIG) of instructions used in a nested Atomic Instruction Group (AIG).

FIG. 8 is a generallised flowchart that shows the flow of decoding and execution of instructions in a computing system that uses the current invention.

DETAILED DESCRIPTION OF THE INVENTION

The detailed description explains the preferred embodiments of the invention, together with advantages and features, by way of example with reference to the drawings.

Figure 1:
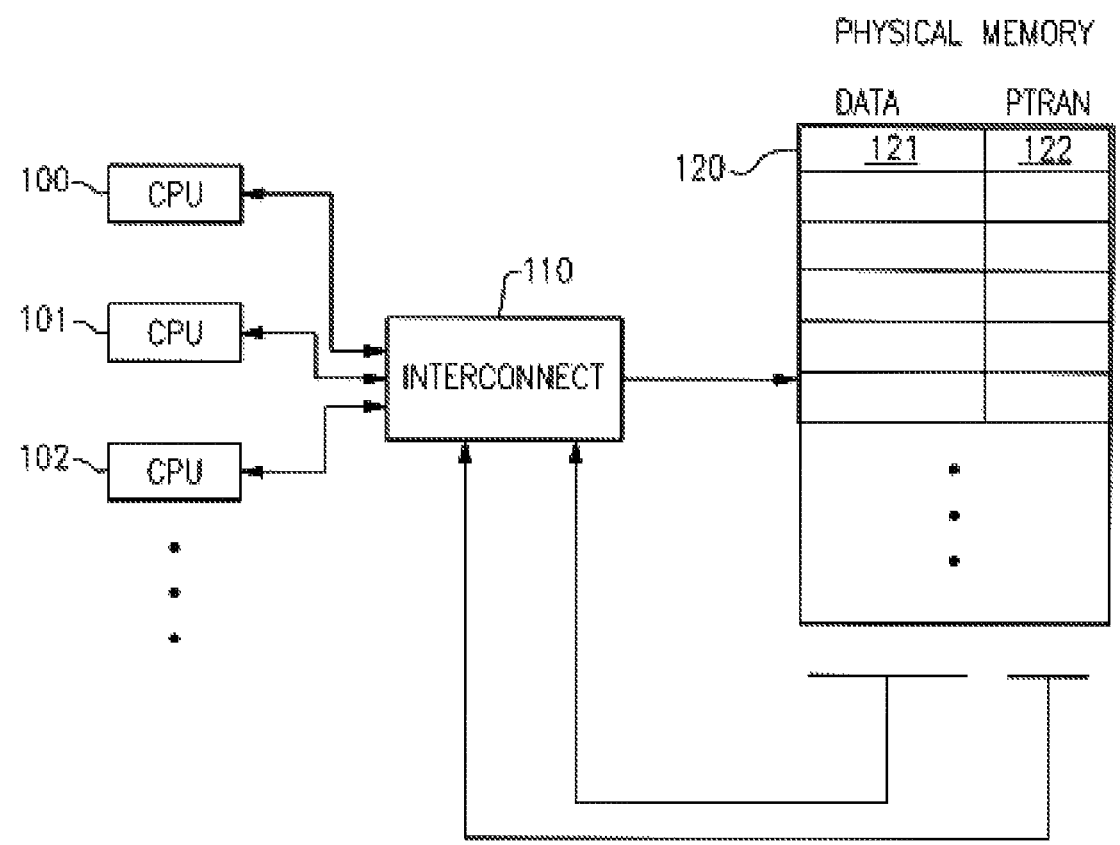
FIG. 1 illustrates our computing system with optimised transactional memory using physical memory.

Turning now to the drawings in greater detail, it will be seen that In FIG. 1 there is a computing system illustrating an embodiment of our invention which has one or more microprocessors (100,101,102) coupled to a physical memory array (120) via an interconnection element (110). The physical memory array stores transaction data (121) and "private to transaction" (PTRAN) tags (122) which are associated with every increment of real system memory. The interconnection element (110) can be implemented as a shared bus or crossbar switch. The invention applies to systems which use any other scheme of interconnecting physical memory to a multiprocessor system which may be implemented in one or more chips. The memory could be broken down into smaller portions and distributed across private connections to each of the CPU chips as done for the IBM Systems using the Power4 microprocessor or for the AMD Opteron based servers. The microprocessors and memory controllers may be located together on a single silicon chip or they may be spread across multiple chips.

The physical memory of the competing system is divided into n increments. One or more "private to transaction" bits (PTRAN) associated with every increment of real system memory are provided for each of the n increments. The invention allows for the choice of any memory increment size and the best choice will depend on workload characteristics, hardware costs and data caching structure used in the target system. An increment of 16 bytes is used in the illustrated embodiment. The PTRAN bit(s) are used to indicate whether (or not) a data entry in memory is part of the speculative memory state of an uncommitted transaction that is currently active in the system.

Special new instructions (BEGIN_AIG, END_AIG) as illustrated by the Nested AIG code sequence of FIG. 7 are used to mark the beginning and end of a group of instructions. The instructions which execute between the special new instructions are referred to as an "Atomic Instruction Group" (AIG) illustrated by AIG instructions shown in FIG. 7 (Instruction A0, Instruction A1, Instruction A2). Additional storage access rules are used when a processor is executing instructions which are part of an Atomic Instruction Group. All of the storage locations modified by the AIG group of instructions are updated in memory in an atomic fashion. The updates to the storage locations are kept "pending" until the processor and/or software application indicates that they should be "committed". All of the updates are either committed to "normal" memory at once or they are discarded. The results are discarded when hardware and/or software detects a conflict between the storage accesses of multiple AIGs that are executing concurrently in the multiprocessor system. The invention provides a way for hardware to quickly detect potential conflicts between the storage accesses of multiple AIGs. Although the invention uses special new instructions to mark the boundaries of a transaction, any other method could be used to identify a group of memory locations that are to he updated in an atomic fashion. The invention is compatible with any number of software interfaces that may be used to implement a transactional memory system. The invention can provide the same fast conflict detection for any system which is attempting to provide an atomic update of multiple storage locations. The invention also applies to systems which mark the boundaries of an instruction group in any other ways, including compiler generated hints attached to other instructions, internal microprocessor commands generated by internal microcode or millicode.

The PTRAN tag is one or more bits associated with an increment in memory which is set for all memory accesses generated by instructions that are part of an Atomic Instruction Group. A processor inspects the bit before attempting to set it; this enables the quick detection of potential conflicts with other AIGs that are concurrently executing on other threads. The setting of the bit may be accomplished by a TS "test and set" operation of the IBM z/Architecture (as described by the IBM z/Architecture Principles of Operation) or any other equivalent operation that enables an atomic update in a multithreaded or multiprocessor system.

Figure 2:
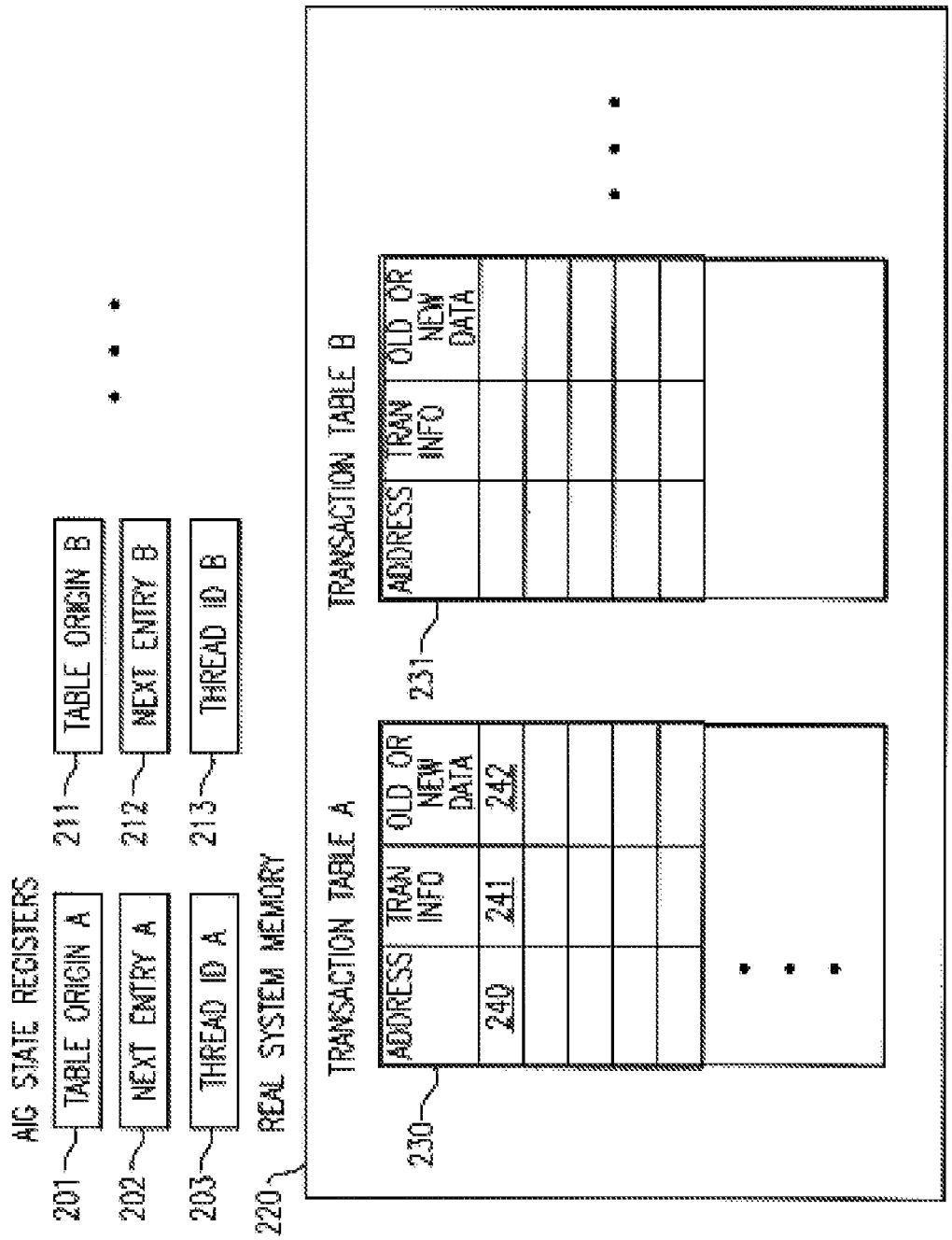
FIG. 2 illustrates our real system memory transaction tables.

Turning now to FIG. 2, it will be seen that Transaction Tables (230,231) are created as part of the real system memory (220) which is illustrated here as physical memory. The Transaction Tables could also created in logical or virtual memory. Any system to map the logical system memory to the physical system memory can be used, and there are numerous examples known in the art which can be used, such as those in the IBM zSeries. IBM's p Series, Sun Microsystems' SPARC, Intel's IA32 etc. A Transaction Table entry is made when instructions that are part of an Atomic Instruction Group cause a memory location to be inspected or updated. A Thread IB (203,213) is associated with each Transaction Table. A Next Entry register (212,212) is used as an index into the Transaction Table and indicates which entry should be written next. A Table Origin (201,211) indicates the address of the first entry of the Transaction Table for its thread (203, 213). The Transaction Table is used to hold additional information beyond the simple information that is associated with the PTRAN tag bit or bits that are associated with the memory location that has been inspected or updated. This additional information is related to the speculative state associated with an Atomic Instruction Group. In an illustrated IBM zSeries or pSeries CPU (100, 101, 102) embodiment which we describe here we prefer to use a single PTRAN bit. In this case the Transaction Table will contain all additional information about the speculative state, therefore the PTRAN bit will only indicate that a physical address is involved in an AIG. This is illustrated for Transaction Table A (230) as the address (240), the transaction info identifier (241) and old or new data (242). Other embodiments of the current invention may use additional PTRAN bits which can he used by hardware or software to speed the processing of certain events involved in the processing of Atomic Instruction Groups or the speculative states of any other transactional memory system. The combination of using just a single bit in memory and associating that bit with a more complete description of the transactional state in the Transaction Tables provides a transactional memory system which requires very little hardware overhead without incurring the performance penalty seen in prior-art software transactional memory systems.

Turning again to FIG. 2, it will be seen as we said that an entry in the Transaction Table, A for example (230), comprises the address (240) that has been inspected or updated inside of an AIG, a Tran Info field (241) and a Data Field (242). A store instruction that is part of an AIG will, cause the system to copy the "old" data value from the original storage location to the Transaction Table entry for that address and the new speculative data is placed in the main storage location.

The invention can be made to work with the new values held in the Transaction Table if desired. The preferred embodiment places the "old" data value in the transaction table. This allows the system to be optimized for the case where most transactions are successful. The old data can be discarded quickly when it is no longer needed, when a transaction is committed permanently to memory, by changing the pointer to the transaction table or by clearing the contents of the transaction table. The Trail Info field of a Transaction Table entry (241) includes any transaction information that is needed to make detailed decisions about the need to cause a transaction failure. It also has provisions for additional information to allow efficient support of nested transactions, virualized transactions or other extensions of the transactional memory architecture. In the preferred embodiment, the Tran Info field includes an indication of whether the storage access of the associated address (240) was a load type access or a store type access. The Tran Info field (240) can also indicate whether the address is shared among multiple AIGs in the system.

Figure 3:
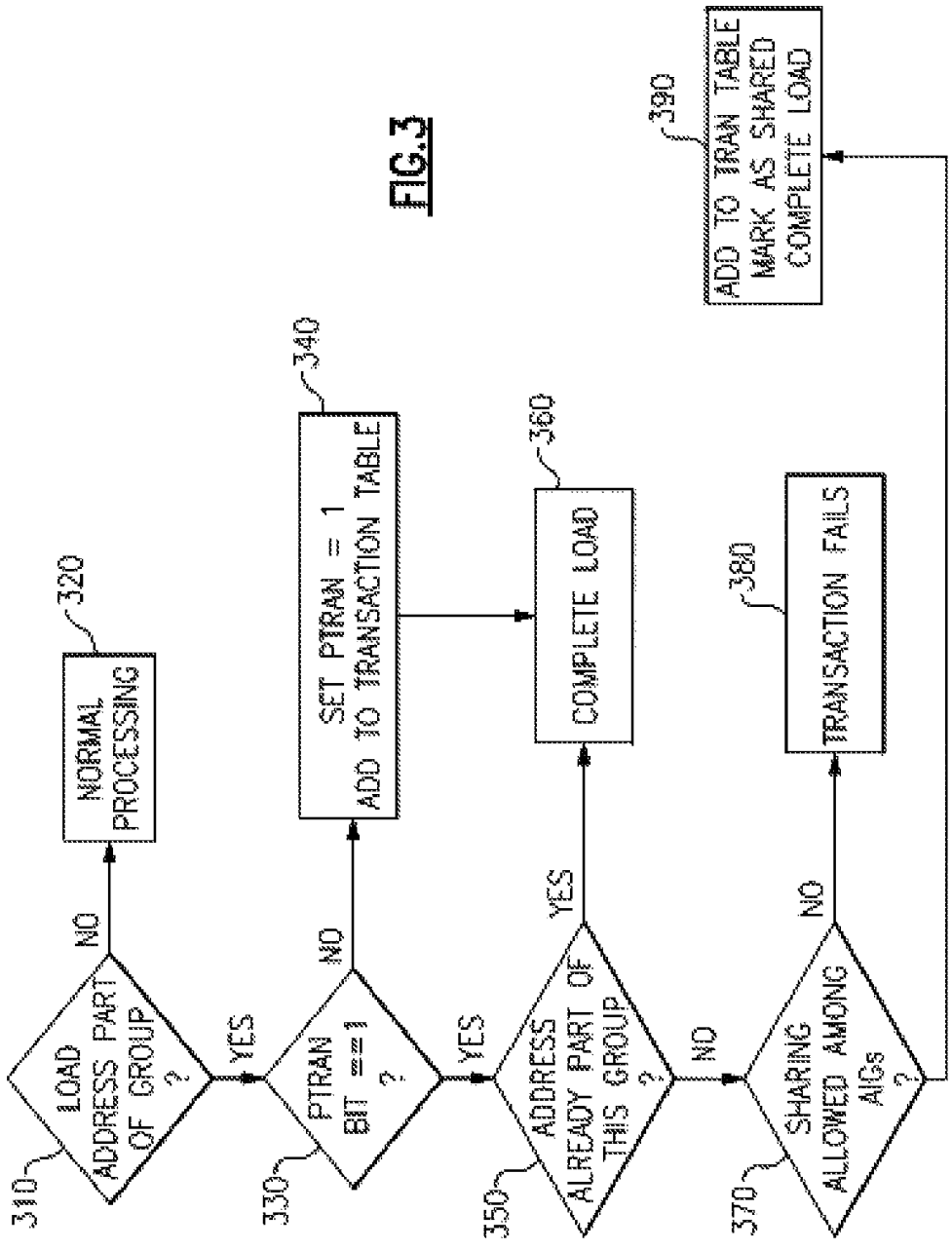
FIG. 3 shows our load processing flowchart.

FIG. 3 shows a load processing flowchart for the actions for tracking a speculative state using the PTRAN bit and the Transaction Tables. When a processor attempts a load type access, initially a decision (310) is made to determine whether the load access address is part of an AIG and whether the special storage access rules for AIG accesses apply. If not, normal processing applies and a normal load processing (320) operation is followed. Whether or not a load type access is part of an AIG may be determined in many different ways in the decision process step (310). A mode bit may be set in the processor pipeline or in load/store units to indicate that a special AIG mode of operation is active. The mode may be part of the physical state of the processor or the logical state of a virtual processor. If the special mode of operation is not active then the load is treated as a normal load (320).

An "override" of this "AIG active mode" may be provided. The override could be associated with the logical memory segment or logical memory page which contains the target address. An override forces the system to treat the storage request as normal in spite of the fact that the request is part of an AIG. If the override is active then the result of the decision (310) will cause normal processing (320) to take place. Assuming that an AIG is active and the override is not, then the associated PTRAN bit is inspected at an inspection step (330). A load instruction inside of an AIG detects upon inspection the state of the PTRAN bit. When the PTRAN bit is already set (330) it is due possibly to the actions of another thread executing on the same processor or on another processor. If at the inspection step 330 it is found that the PTRAN bit is not set (340) then the processor sets the PTRAN bit and make a record of the access in the Transaction Table (230) for the active AIG by adding to the Transaction Table at the Set PTRAN step (340) and then the complete load can continue (360). If the PTRAN hit is already set, the address which caused this potential conflict is compared with the addresses already entered In the processor's Transaction Table. If the PTRAN hit was set when tested at the inspection step (330) by another load earlier In the same AIG, it is already part of the AIG as tested and determined (350) and then the complete load may continue (360). Each Transaction Table (230, 231) contains the addresses for a particular AIG. Accordingly, if the address was not already part of the AIG as tested and determined (350) then the address for the load is not found in the processor's Transaction Table and then the processor checks whether the address is enabled for sharing among AIGs in a determination step for AIG sharing (370). If the address is not currently enabled for sharing among multiple AIGs the processor may signal other processors in the system to request a "shared AIG access" for this address during the determination step whether sharing is allowed among AIGs (370). A shared access can be granted if no other AIG in the system has speculatively written the storage location. If the shared access is not granted then the AIG fails (380), otherwise (390) the load address is added to the Transaction Table (230) and the Tran Info field (241) is updated to indicate that the address is a load access that is shared among multiple AIGs in the system.

Figure 4:
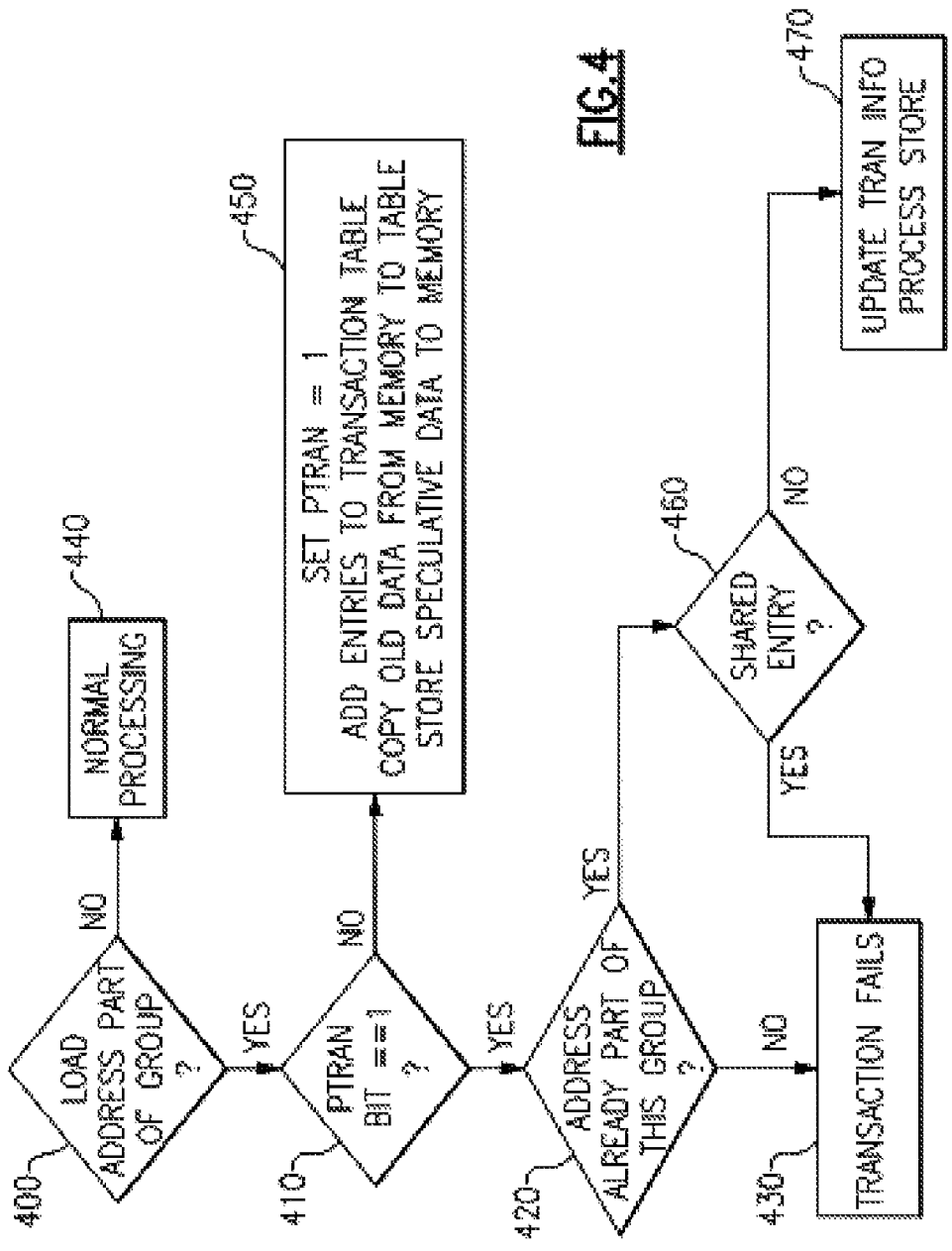
FIG. 4 shows our store processing flowchart.

FIG. 4 Store Processing Flowchart shows the actions for processing a store that is part of an AIG. When a processor attempts a store type access initially a store decision (400) is made to determine whether the access is part of an AIG and whether the special storage access rules for AIG accesses apply. The mode of the processor is checked in a similar method as previously described for load accesses. If the special mode of operation, under which the special access rules for AIG accesses apply, is not active then the store is treated as a normal store (440). Assuming that an AIG is active, the associated PTRAN hit is inspected at the store process inspection step (410). If the PTRAN hit is not already set then the PTRAN bit is set at the store transaction step (450) and a new entry is added to the Transaction Table (230). The "old data" is moved to the Transaction Table entry (242), the address is written to the new entry (240) and the Tran Info field (241) is updated. The Tran Info field (241) is marked to indicate that the access associated with this entry was a store type access. The new store data is written to memory after the setting of the PTRAN bit is completed. If the inspection of the PTRAN bit (410) indicates that the bit was already set then a decision (420) is made based on whether the current store address is already part of an AIG which is active on the processor. The Transaction Table (230) for the processor is examined, if it is determined that the address is present in the Transaction Table then the Tran Info (241) for the entry is checked and a decision as to shared success entry (460) is made. If the Tran Info indicates that the entry is a load type access entry that is shared among multiple AIGs, the transaction fails (430) otherwise the Tran Info field for the associated entry is updated to indicate a store type access and the store is processed (470).

Figure 5:
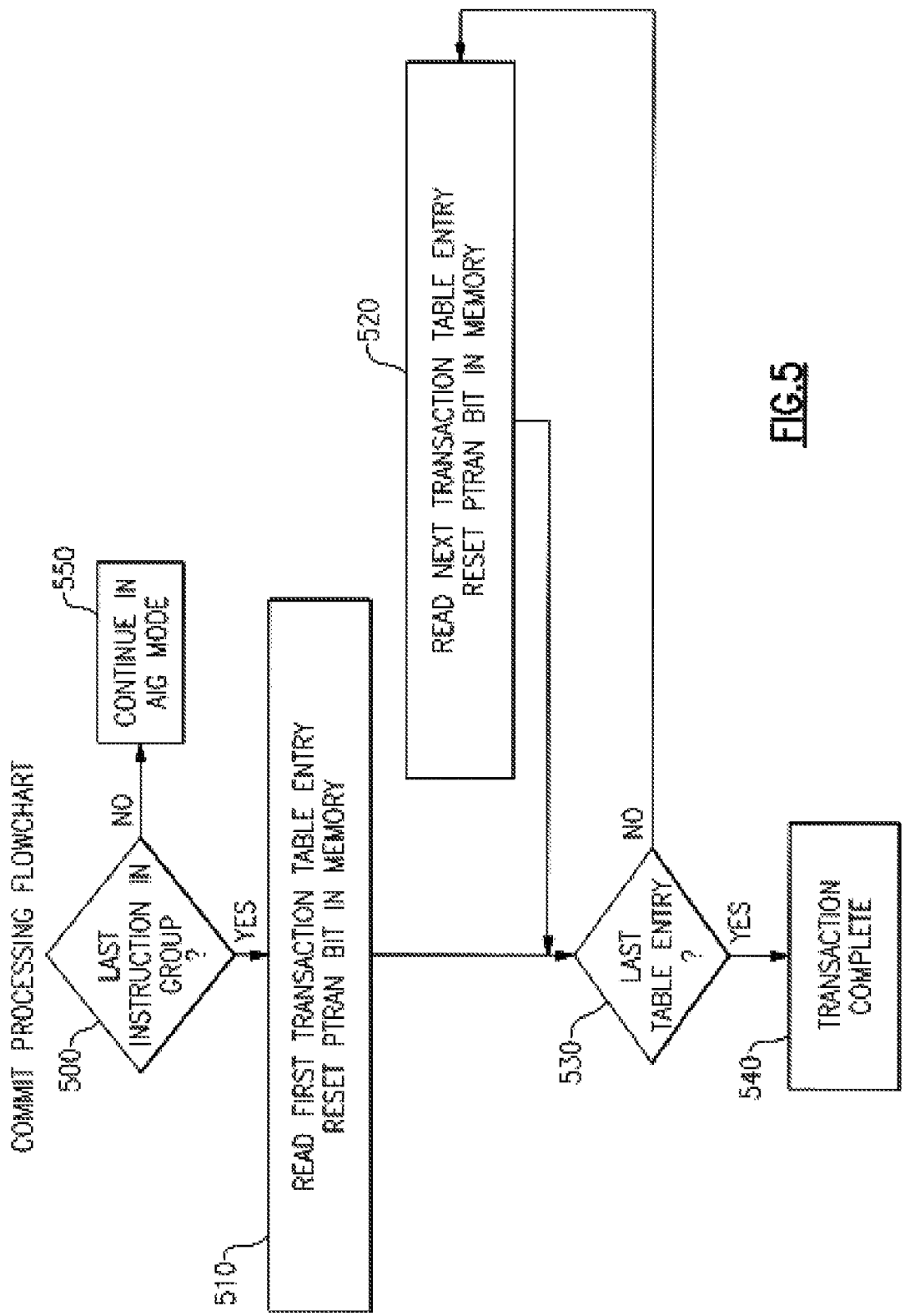
FIG. 5 shows our commit processing flowchart.

Turning now to the Commit Processing flowchart of FIG. 5, it will be seen that the invention includes a set of actions completed when the last instruction in an AIG has been processed and the entire group is ready to be "committed" permanently to memory as determined initially at a test step (500). If not, the processing continued in AIG mode (550). An AIG is committed to memory when the processing of the loads and stores of the AIG according to flowcharts from FIG. 3 and FIG. 4 does not result in a Transaction Failure. In the case of AIG success then testing (500) determines the last instruction in an AIG has been processed and the entire group is ready to be "committed" permanently to memory. Then the Transaction Table is examined (510,520) and each entry for the AIG to be committed is read and its associated PTRAN bit is reset in memory at the Transaction Table commit step (530) determination.

A specialized hardware engine may he used to complete the performance of this commit operation. A combination of processor caches, multiprocessor coherency actions and the current invention can be used to provide software with the illusion that all of the memory updates for a single AIG occur simultaneously even though the main memory storage arrays are not updated simultaneously. During the commit processing, the resetting of the PTRAN bits continues until the last valid entry in the Transaction Table has been determined to be reached (530). At this point the AIG is considered to be committed and the performance by the engine therefore completes (540).

Some conditions prevent the completion of an AIG. These conditions may he detected during load processing while executing an AIG (380) or during store processing while executing an AIG (430). There are many other possible processor conditions that may cause the need to abort the processing of an AIG. These include error conditions detected in the system as well as other conditions that would require significant additional, hardware support to enable the processor to handle them correctly. Many prior-art transactional memory architectures include provisions for the abort of transactions and for a subsequent retry. Prior-art software constructs can be used together with the current invention to eliminate the need to provide hardware to deal with all possible special cases. A simple example is the case of a timer interrupt in the middle of processing an AIG. The interrupt may cause the processor to spend a large amount of time running code that is not part of the partially completed AIG. It may not be desirable for the processor to keep the AIG active during this time. The system can force a transaction failure for any AIG that is currently executing when a timer interrupt occurs. A similar approach can be used for any other special case events occurring in the processor.

Transaction failures or forced retries are handled according to the process of the Rollback Processing Flowchart for "rollback" processing shown in FIG. 6. Turning now to FIG. 6, it will be seen that the lack of a transaction failure condition (600) allows the processor to continue in the AIG active mode (650). The preferred embodiment of the current invention uses an "eager" policy with respect to detecting transaction failures and causing transaction rollback. Also, the invention may be used in systems that wait until the end of a transaction to take the actions required for a rollback. The memory updates executed as part of an Atomic Instruction Groups, are either committed to normal main storage at the same time (FIG. 5) or they are discarded with a "rollback" operation (620-640).

Upon finding a transaction failure condition (600) failure several additional steps are required (610,620). Rollback Transaction Table processing entry steps provide that the Transaction Table (230) for the AIG is inspected and any "old" data (242) is written back to the main memory address (240) indicated in the entry. The PTRAN bit for the associated address is reset. The rollback processing (620) continues until the last valid entry in the table has been processed (630). After the last valid entry has been processed, the rollback is complete (640). The actions taken by the processor at this point will differ based upon various software architectures for transactional memory. Any of transactional memory architectures described in the background may be used. In some cases the AIG will be retried from the beginning. In other cases special software handlers will be invoked to deal with the transaction failure. The current invention may be used with any of these different architectures.

The current invention supports the execution of "nested" transactions. A second AIG may be included within the scope of the first AIG as shown in FIG. 7. Each BEGIN_AIG special instruction (FIG. 7) statement causes the system to create a Transaction Table (230) and to associate the table with the AIG. Decisions about whether or not a storage address belongs to an AIG (350) may include the inner AIG (A) or the combination of the inner and outer AIGs (A & B). The END- AIG special instruction statement (FIG. 7) ends the transaction sequence, but as shown, a sequence for a specific transaction (Transaction B) may he nested within another sequence (Transaction A) The use of multiple Transaction Tables (230) may be used to support many nesting architectures for transactional memory. Multiple versions of the "old data" may be stored in any number of Transaction Tables (230) at any nesting depth. Prior-art transactional memory systems that rely on data caches to hold speculative state are unable to provide similar support for nested transactions without adding additional state information to cache directories and adding additional complexity to the cache coherency protocol. Nesting support on prior-art systems would impose a large hardware complexity penalty on those designs. The current invention can also be extended to include a combined Transaction Table that includes entries from both the inner AIG (Instruction B0, Instruction B1) and the outer AIG (Instruction A0, Instruction A1, Instruction A2). This Combined Transaction Table may be used in place of the individual Transaction Tables or in addition to the individual Transaction Tables.

There are many additional hardware features that can be added to the invention to speed the processing of the Transaction Table manipulations and the setting and resetting of the PTRAN bit(s). Since the PTRAN bit is part of the main storage data, it can be cached in the normal data caches of the system. The Transaction Tables are also part of main storage and can also be cached. Additional control information can be added, to the data caches to indicate whether a specific address has been enabled for "shared AIG access" and therefore eliminate the need to search the Transaction Table for some cases.

The capabilities of the present invention, as described above can be implemented in software, firmware, hardware along with some combination of software, and firmware.

As one example, one or more aspects of the present invention can be included in an article of manufacture (e.g., one or more computer program products) having, for instance, computer usable media. The media has embodied therein, for instance, computer readable program code means for providing and facilitating the capabilities of the present invention. The computing system described herein is able to detect the signal and recover a computer program embodied therein. It makes no difference whether the computer program is embodied in a physical media such as a hard drive or computer memory or on a CD or within a data signal. The underlying program is usable by the computing system to execute the steps described for a computer readable memory to execute the encoded functions regardless of the format of origin of the encoded program or whether the format is a disk or a signal.

The article of manufacture can be included as a part of a computer system or sold separately.

Additionally, at least one program storage device readable by a machine, tangibly embodying at least one program of instructions executable by the machine to perform the capabilities of the present invention can be provided.

FIG. 8 shows the flow of decoding and execution of instructions in a computing system that uses the current invention. The preferred embodiment of the invention uses a BEGIN_AIG instruction to indicate the beginning of an AIG and an END_AIG instruction to indicate the end of an AIG. Any other suitable method of marking the beginning and end of a group of instructions can be used. The instructions or marks may be inserted in the code explicitly by programmers in a high level language or added by compilers or translators as implementations of high level locking functions. The instructions or marks may be added by a library function call or be included by a special event in a runtime environment. The instructions or marks may be generated by firmware, hardware or a combination of both as a response to decoding a particular sequence of instructions or receiving a special command to enter a new mode of execution.

The preferred embodiment identifies the beginning of an AIG after decoding of an instruction (800). If it is determined that a BEGIN_AIG instruction has been decoded (805) the processor enters a new mode of execution, AIG MODE (815), otherwise the instruction is executed as usual (810) and processing continues with the next instruction (800).

Prior to entering AIG MODE, the architected state of the processor is saved in the same manner that a traditional Program Call is handled in the IBM Z-Series architecture. Any similar state saving mechanism may be used on any other processor architecture. The processor may return directly to this saved state if the AIG fails or may return to this state after a series of other error handling routines have been invoked. While to AIG MODE, decoding of instructions continues (820). If a load or store is decoded (825) then special handling of these loads and stores is required (840). The steps required for the processing of a load inside of an AIG are described in FIG. 3, those for a store inside of an AIG are described in FIG. 4. After loads and stores in an AIG are processed it is determined (850) whether there has been an AIG failure as described in the descriptions of FIG. 3 and FIG. 4. If there is a failure then special handlers are invoked (860). The actions of the special handlers for transaction failure may vary depending on the architecture of the system, using the invention. Many methods of dealing with transaction failures have been described in the prior art, any of them could he used for this purpose. The possible methods include retrying the transaction from the beginning for a set number of attempts, waiting for the condition that caused the failure to change, calling specialized software routines to resolve conflicts among threads etc. These possible failure handlers may require the rollback of the AIG which caused the failure (860). If no failure was detected then it is determined whether the load or store was the last instruction of the AIG (855). If the instruction is the last instruction in the AIG then the AIG is committed (865) using the process described in FIG. 5. The processor then exits the AIG Mode and continues with the next sequential instruction after the AIG (800).

The decoding of instruction other than loads and stores inside of an AIG does not necessarily require special processing (830). If the instruction is not a load or store type instruction then it is determined whether the instruction is another BEGIN_AIG (830). Nested AIG instructions require special handling (835). The prior art contains many different ways of handling nested transactions. The current invention can be used to support any of them. The nested AIG handler for the preferred embodiment adds the instructions of the "inner" AIG to the "outer" AIG creating a single larger AIG. Other embodiments of the invention may provide different roles of processing for loads and stores that are part an inner nested transaction as well as special rules for the commitment and failure handling of inner nested transactions. If it is determined that the instruction is not a BEGIN_AIG then the instruction is executed (845) and it is next determined (855) whether the instruction is the last instruction of the AIG. The preferred embodiment uses the decoding of an END_AIG instruction to indicate that the last instruction of an AIG has been reached. If the last instruction of the AIG has been reached then the AIG is committed to memory and the processor exits the AIG MODE of operation (865).

The flow diagrams depicted herein are just examples. There may be many variations to these diagrams or the steps (or operations) described therein without departing from the spirit of the invention. For instance, the steps may be performed in a differing order, or steps may be added, deleted or modified. All of these variations are considered a part of the claimed invention.

While the preferred embodiment to the invention has been described, it will be understood that those skilled in the art, both now and in the future, may make various improvements and enhancements which fall within the scope of the claims which follow. These claims should be construed to maintain the proper protection for the invention first described.

What is claimed is:

1. A method comprising:
  executing, by a computing system, a string of instructions to complete a transaction of a first thread of a transaction program, beginning with one instruction of said string of instructions; and
  managing memory access to a shared memory location for transaction data of the first thread, the shared memory location accessible by the first thread and a second thread, the shared memory location being an increment of real system memory, each increment of real system memory having a 'private to transaction' (PTRAN) tag directly addressable as part of each increment of real system memory, the managing comprising:
  determining whether said one instruction is part of an active atomic instruction group (AIG) of instructions associated with the transaction of the first thread, said active AIG identifying a group of memory locations that are to be updated in an atomic fashion;
  based on determining that said one instruction is part of said active AIG:
    inspecting a PTRAN tag associated with the shared memory location to determine whether there is an active transaction associated with the shared memory location;
    based on determining that there is no active transaction associated with the shared memory location, updating the PTRAN tag associated with the shared memory location to indicate that the shared memory location is part of the active AIG, and locating a transaction table in physical main data storage which provides for entries in an active mode for said active AIG;
    based on determining that there is an active transaction associated with the shared memory location, determining whether the shared memory location is already part of the transaction table; and
    wherein all of the entries in the transaction table correspond to the first thread, and all storage locations inspected or modified by instructions of said active AIG remain pending until the computing system indicates that the storage locations should be committed; and
  based on determining that said one instruction is not part of an active AIG, executing a next instruction under normal execution mode.

2. The method according to claim 1 further comprising: responsive to determining that said one instruction is part of said active AIG, executing a next instruction in said active AIG.

3. The method according to claim 1 wherein in processing an instruction said computing system inspects a bit associated with an indicated address of the shared memory location for a load or a store to determine whether said address has an active transaction table and to determine whether such address has a potential conflict with another AIG that is concurrently executing on another thread of said computing system.

4. The method according to claim 1 further comprising: adding an entry to the transaction table for the shared memory location based on updating the PTRAN tag associated with the shared memory location to indicate that the shared memory location is part of the active AIG.

5. The method according to claim 1 wherein in processing an instruction said computing system inspects a bit associated with an indicated address of the shared memory location for a load or a store to determine whether said address has an active 'private to transaction' (PTRAN) tag that is associated with the address of the shared memory location that is being inspected or updated and is used to indicate one of that a data entry in memory is part of a speculative memory state of an uncommitted transaction that is currently active in the system and that the data entry in memory is not part of a speculative memory state of an uncommitted transaction that is currently active in the system.

6. The method according to claim 1 wherein each PTRAN tag is one or more bits which is set for all memory accesses generated by instructions that are part of an atomic instruction group.

7. The method according to claim 1 wherein in processing an instruction said computing system inspects an associated PTRAN tag before setting it.

8. The method according to claim 1 further comprising identifying a group of memory locations that are to be updated atomically by an atomic instruction group (AIG) of instructions associated with a particular active transaction and in which all storage locations to be modified by the active atomic instruction group of instructions are held pending until the computing system indicates that the storage locations related to the first thread of the transaction should be committed.

9. The method according to claim 1 further comprising identifying a group of memory locations that are to be updated atomically by an atomic instruction group (AIG) of instructions associated with a particular active transaction and marking the boundaries of said particular active transaction with special instructions to identify to the computing system that instructions within the boundaries are part of the active atomic instruction group of instructions for the transaction, and in which all storage locations to be modified by the active atomic instruction group of instructions are held pending until the computing system indicates that the storage locations related to the first thread of the transaction should be committed.

10. The method according to claim 1 wherein data for a transaction being processed is stored in a transaction table in which an entry is made and an instruction that is part of an atomic instruction group causes a memory location to be inspected or updated.

11. The method according to claim 1 wherein data for a transaction being processed is stored in a transaction table that is distinct from virtual memory page tables of the system and in which transaction table an entry is made and an instruction that is part of an active atomic instruction groups causes a memory location to be inspected or updated.

12. The method according to claim 11 wherein special instructions mark the boundaries of a transaction at the beginning and end to identify a group of memory locations that are updated atomically.

13. The method according to claim 10 wherein a thread identification value is associated with the transaction table, and a next entry register is used as an index into the transaction table and indicates which entry should be written next, and a table origin value indicates the address of a first entry of the transaction table for the thread associated with the transaction table.

14. The method according to claim 1 wherein data for a transaction being processed is stored in a transaction table in which an entry is made when an instruction that is part of an atomic instruction group causes a memory location to be updated after inspecting a bit associated with said entry which is part of the physical main data storage and said bit can be cached in normal data caches of the system, and the transaction table is also part of the physical main data storage and can also be cached.

15. The method according to claim 14 wherein control information added to the data caches indicates whether a specific address has been enabled for sharing among AIGs.

16. The method according to claim 1 wherein the transaction table holds additional information related to a speculative state associated with an atomic instruction group.

17. The method according to claim 16 wherein the transaction table contains all additional information about the speculative state.

18. The method according to claim 1 wherein all storage locations modified by the atomic instruction group are updated in memory atomically.

19. A computer program product comprising a tangible storage medium readable by a processing circuit and storing instructions for execution by the processing circuit for performing a method comprising:
   executing, by a computer, a string of instructions to complete a transaction of a first thread of a transaction program, beginning with one instruction of said string of instructions; and
   managing memory access to a shared memory location for transaction data of the first thread, the shared memory location accessible by the first thread and a second thread, the shared memory location being an increment of real system memory, each increment of real system memory having a 'private to transaction' (PTRAN) tag directly addressable as part of each increment of real system memory, the managing comprising:
   determining whether said one instruction is part of an active atomic instruction group (AIG) of instructions associated with the transaction of the first thread, said active AIG identifying a group of memory locations that are to be updated in an atomic fashion;
   based on determining that said one instruction is part of said active AIG:
      inspecting a PTRAN tag associated with the shared memory location to determine whether there is an active transaction associated with the shared memory location;
      based on determining that there is no active transaction associated with the shared memory location, updating the PTRAN tag associated with the shared memory location to indicate that the shared memory location is part of the active AIG, and locating a transaction table in physical main data storage which provides for entries in an active mode for said active AIG;
      based on determining that there is an active transaction associated with the shared memory location, determining whether the shared memory location is already part of the transaction table; and
      wherein all of the entries in the transaction table correspond to the first thread, and all storage locations inspected or modified by an active atomic instruction for said active AIG remain pending until the computing system indicates that the storage locations should be committed; and
   based on determining that said one instruction is not part of an active AIG, executing a next instruction under normal execution mode.

20. A computing system, comprising:
   a plurality of processors and a shared memory accessible by one or more of said processors while said computing system manages memory access to a shared memory location for a transaction being processed, said shared memory location being accessible by a first thread and a second thread on instructions executing on said processors,
   said computing system shared memory having an identified 'private to transaction' tag which is a directly addressable part of the shared memory location to be marked for identifying each increment of system memory and a transaction table in physical main data storage of loads and stores of the first thread for said transaction being processed, wherein all of the entries in the transaction table correspond to the first thread.

21. The computing system according to claim 20 wherein application software processing a transaction does not test a state of a 'private to transaction' tag used for identifying each increment of system memory.

22. A method for load processing in a transactional process employing transactional memory in a computing system, the method comprising of:
   determining that a load instruction is part of an active group of instructions comprising an atomic instruction group (AIG) for a transaction being processed among multiple threads being executed by said computing system utilizing a shared memory location in said transactional memory;
   the shared memory location being an increment of real system memory, each increment of real system memory having a 'private to transaction' (PTRAN) bit directly addressable as part of each increment of system memory;
   inspecting a private transaction bit associated with the shared memory location to determine whether there is an active transaction associated with the shared memory location;
   based on determining that there is no active transaction associated with the shared memory location, setting the private transaction bit and making an entry to a transaction table in physical main data storage associated with said private transaction bit which is a directly addressable part of the shared memory location to be marked, wherein all of the entries in the transaction table correspond to the first thread; and
   based on determining that there is an active transaction associated with the shared memory location, determining whether the shared memory location is already part of the transaction table.

23. A method for store processing in a transactional process employing transaction memory in a computing system, comprising the steps of:
   determining that a store instruction is part of an active group of instructions comprising an atomic instruction group (AIG) for a transaction being processed among multiple threads being executed by said computing system utilizing a shared memory location in said transactional memory;
   the shared memory location being an increment of real system memory, each increment of real system memory having a 'private to transaction' (PTRAN) bit directly addressable as part of each increment of system memory;

inspecting a private transaction bit associated with the shared memory location to determine whether there is an active transaction associated with the shared memory location;

based on determining that there is no active transaction associated with the shared memory location, setting the private transaction bit and making an entry to a transaction table in physical main data storage associated with said private transaction bit which is a directly addressable part of the shared memory location to be marked, wherein all of the entries in the transaction table correspond to a single thread; and based on determining that there is an active transaction associated with the shared memory location, determining whether the shared memory location is already part of the transaction table.

24. The method according to claim 1 wherein a transaction is committed when the entire group instructions in an AIG has been processed and it has been determined that there were no transaction failures during the processing of all loads and stores in the AIG.

25. The method according to claim 1 wherein a rollback occurs when conflicting AIGs occur and an instruction of one AIG attempts to modify another AIG's shared memory location.

* * * * *